United States Patent [19]

Heikes, Jr. et al.

[11] 4,379,112

[45] Apr. 5, 1983

[54] METHOD FOR MAKING A REINFORCED ELASTOMER PISTON PACKING

[75] Inventors: George E. Heikes, Jr.; Claude L. Henderson, both of Denver, Colo.

[73] Assignee: The Gates Rubber Company, Denver, Colo.

[21] Appl. No.: 253,999

[22] Filed: Apr. 13, 1981

Related U.S. Application Data

[62] Division of Ser. No. 92,406, Nov. 8, 1979, Pat. No. 4,280,709.

[51] Int. Cl.³ .............................................. B29H 9/04
[52] U.S. Cl. .................................. 264/159; 264/257; 264/258; 264/259; 264/266
[58] Field of Search ............... 264/159, 257, 266, 258, 264/259

[56] References Cited

U.S. PATENT DOCUMENTS

| | | | |
|---|---|---|---|
| 1,900,298 | 3/1933 | Morris | 264/257 |
| 1,906,397 | 5/1933 | Meyer | 264/257 |
| 2,639,198 | 5/1953 | Kirkham | 277/188 R |
| 3,219,503 | 11/1965 | Blair | 264/257 |
| 3,341,211 | 9/1967 | Houghton et al. | 264/257 |
| 3,634,572 | 1/1972 | Richmond et al. | 264/159 |
| 3,719,366 | 3/1973 | Pippert | 277/230 |

Primary Examiner—James B. Lowe
Attorney, Agent, or Firm—H. W. Oberg, Jr.; Raymond Fink; C. H. Castleman

[57] ABSTRACT

A piston rubber with a body of substantially cylindrical exterior shape with one end thereof reinforced with a textile fabric wound into a roll that is arranged generally coaxial with the cylindrical body. The method for making the piston rubber involves winding a length of rubberized fabric around a mandrel and forming a sleeve of desired radial thickness, cutting the sleeve into bands of desired widths, and placing the bands and elastomeric material in a mold and curing the same to define a piston rubber.

2 Claims, 7 Drawing Figures

METHOD FOR MAKING A REINFORCED ELASTOMER PISTON PACKING

This is a division of application Ser. No. 092,406, filed Nov. 8, 1979, now U.S. Pat. No. 4,280,709.

BACKGROUND OF THE INVENTION

The invention relates to pumps, but more particularly, the invention relates to piston rubbers as used in slurry-type pumps.

Piston rubbers form the major portion of a pump piston by defining a major cylindrical portion and piston seal. Piston rubbers as used in reciprocating, usually double acting, slurry-type pumps such as used by the oil industry for pumping mud during drilling operations. Two piston rubbers are used in each cylinder bore with a disc piston that is connected to an axially reciprocating rod. A piston rubber has a generally cylindrically shaped elastomeric body with a lip-seal end and a reinforced end. Piston rubbers are arranged "back-to-back" with their reinforced ends abutting the disc piston so that the lip-seals face axially away from each other and engage the cylinder bore.

Some of the better piston rubbers (e.g., those piston rubbers having longer service lives) have a multi-layered fabric reinforcement fabricated by stacking a plurality of annular rings together which are individually cut in "cookie" fashion from flat, square woven fabric. A "breaker ply" of heavy gauge fabric may be positioned on the top of the reinforcement stack so that it interfaces with the elastomeric body to provide a modulus transition for improved flex fatigue.

While such piston rubbers provide good service in their intended working environment, their manufacture and use are not free of problems. The "cookie cutter" method of forming the individual fabric plies leaves surrounding flat stock and centers as an economic waste. Sometimes, the stacked plies drift from each other during the molding process and identify points where delaminations of the plies may initiate when the piston rubber is in use. The ends of threads forming the fabric are located along the circumference of the piston rubber end and are subject to wear and wicking which may result in ply delaminations. Once wear begins, support of the piston body is reduced which may cause leakage past the piston and corresponding reduced pumping pressures. Should a burr or rock or other foreign debri arise in a cylinder bore in which a piston rubber is operating, it tears at the thread ends of the plies causing premature delamination with associated loss of pumping pressure.

SUMMARY OF THE INVENTION

In accordance with the invention, a piston rubber of generally a cylindrical shape is provided which has a reinforcement embedded near one end thereof. The reinforcement is made of a textile fabric that is circumferentially wrapped to form a roll. The axis of the roll is arranged substantially coaxial with the longitudinal axis of the cylindrical body.

An object of the invention is to substantially reduce scrap material when fabricating a reinforcement.

Another object of the invention is to provide a piston rubber having improved wear resistance at the embedded reinforcement piston end by way of excluding exposure of thread ends along the circumference of the piston rubber.

Still another object of the invention is to provide a piston rubber that inhibits reinforcement delamination due to mechanical interference with cylinder burrs, rocks, metal chips or the like.

These and other objects or advantages of the invention will be apparent after reviewing the drawings and description thereof wherein.

DESCRIPTION OF PREFERRED EMBODIMENTS

Figure 1:
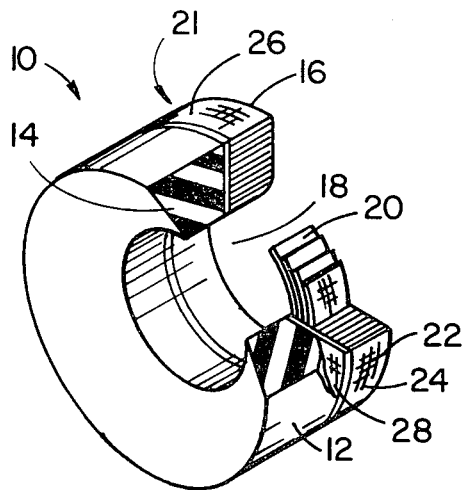
FIG. 1 is a cutaway isometric view showing a piston rubber of the invention.

The piston rubber 10 of the invention has a generally cylindrical elastomeric body 12 that forms an integral lip-type seal 15 at one end and has an embedded reinforcement 16 at its opposite end. The piston rubber optionally has an axial bore 18 as a means for attaching the piston rubber to a pump piston disc. The elastomeric body is made from any suitable elastomer such as the natural or synthetic rubbers or blends thereof. The reinforcement may be made with any of the suitable textiles such as cotton, aramid, nylon, rayon, polyester or the like.

The reinforcement 16 is a strip 20 of textile fabric circumferentially wound into a band or roll 21 that is arranged generally coaxial within the cylindrical body. The fabric has sets 22, 24 of warp and fill threads where one of the sets 22 of threads are optionally, but preferably, circumferentially oriented with the cylindrical body. The remaining set 24 of crossing threads are oriented generally with the longitudinal axis of the body so that side surface portions thereof are juxtaposed a cylindrical surface portion of the body. Optionally, the sets of threads of the strip may be on the bias to the axis of the roll. The terms "wound or wrapped" are used to describe any generally circumferential type wrapping such as individual annular plies with butt splices. More preferably, the terms "wound or wrapped" are used to describe fabric that is spiralled over itself in roll-like fashion. Some inner plies of the strip 20 may be dearranged 25 during molding of the piston rubber without affecting performance thereof.

The "wound" reinforcement orientation provides several improvements over the prior art. Side portions of the threads define a wear-resistant surface 26 at the circumferential edge of the piston rubber. Not only does this provide an improved wear-resistant surface over the exposed "end" thread arrangement of the prior art, but it reduces the radial fabric ply separation problem of the prior art as when an operating cylinder bore develops a burr. It is believed that the longitudinal orientation of the fibers has the advantage of increasing modulus at the base of the piston by putting the longitudinal set 22 of threads in tension and surrounding elastomeric material in sheer. The circumferentially wound set 24 threads provide good hoop strength to minimize radial growth. The prior art plied ring construction puts the threads and elastomer into a bending mode which is believed to be structurally weaker.

In some applications, it is optional to use a known "breaker band" 28 of heavier gauge square woven material to provide a change in modulus between the wound reinforcement and elastomeric body and thereby inhibit radial shear planes that could cause separation.

METHOD

When making the piston rubber 10 of the invention, a length 30 of rubberized fabric is wrapped several times around a mandrel 32 to form a plied sleeve 34 having a desired radial thickness 36. The fabric is of the type having sets 22, 24 of warp and fill threads that cross each other. The fabric may be wrapped so that one of the sets of threads form an angle therewith, but preferably, the fabric is wrapped on the mandrel so that one of its set 24 of threads is circumferential therewith. For convenience, it is preferred that the fabric just be spirally wrapped around the mandrel. However, individual circumferential, annular layers could be wound on the mandrel by butt splicing individual plies. The wrapping procedure is akin to that disclosed in U.S. Pat. No. 1,307,731 to Gates.

Individual bands or rolls 21 are radially cut from the plied sleeve such as by plunging P a knife into the rotating R sleeve. The bands are cut to a desired width 38. The individual bands are then placed into a mold cavity with an elastomer where they are molded, heated, and cured to define a piston rubber. The process is quite different from that inferred by the Gates patent relating to V-belts where the entire sleeve is cured before individual bands are cut therefrom.

Figure 5:
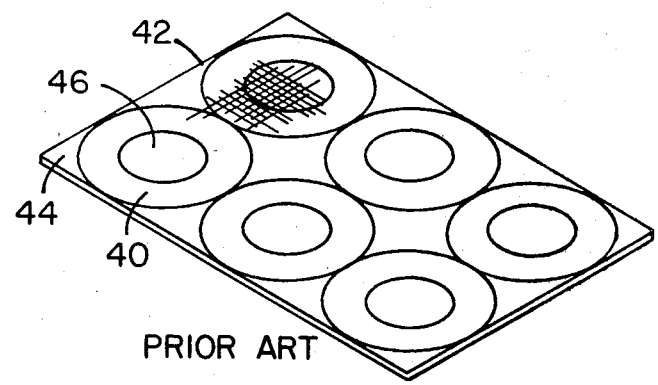
FIG. 5 is a view showing a prior art method of forming flat plies of a prior art reinforcement.
Figure 2:
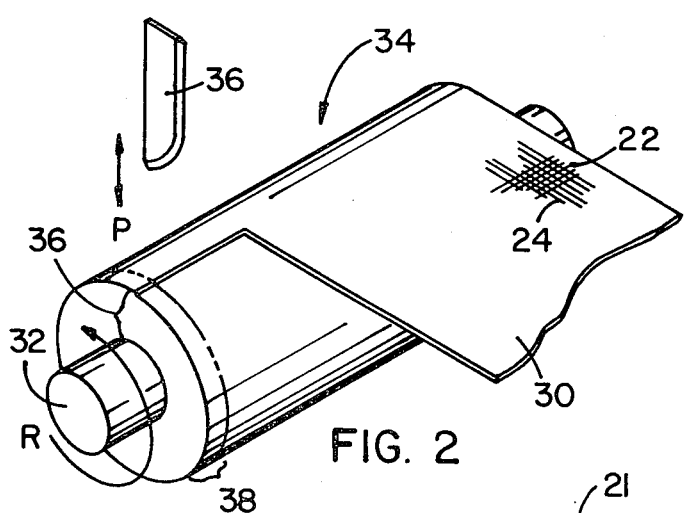
FIG. 2 is an isometric view showing a method for fabricating a reinforcement for the piston rubber of the invention.
Figure 7:
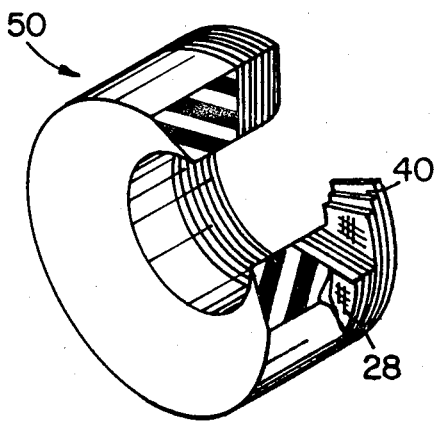
FIG. 7 is a view similar to FIG. 1 but showing a prior art piston rubber.
Figure 3:
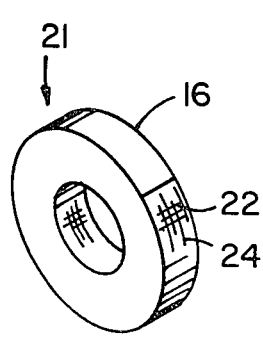
FIG. 3 is an isometric view of a reinforcement as formed by the methodology of FIG. 2.
Figure 4:
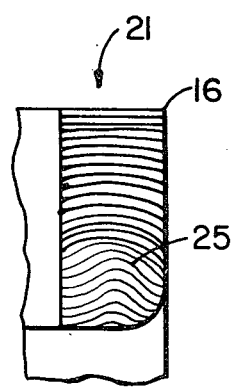
FIG. 4 is a view taken along the line 4—4 of FIG. 1.
Figure 6:
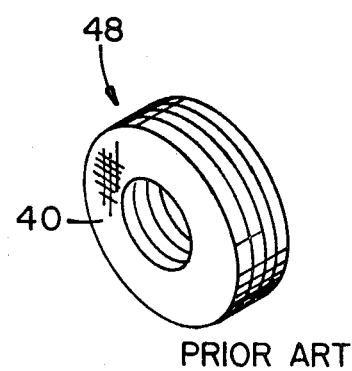
FIG. 6 is a view similar to FIG. 3 but showing a prior art reinforcement.

A major advantage of the invention is that it provides about a 40-50 percent material saving over the method and construction exemplified by FIGS. 5 through 7 where individual rings 40 are "cookie cut" from a rubberized fabric 42 leaving a perforated sheet 44 and circles 46 of material. The rings are stacked together to form a reinforcement assembly 48 that is used as a reinforcement in a prior art piston rubber 50.

The foregoing description is made for purpose of illustration only and is not intended to limit the scope of the invention which is to be determined from the appended claims.

What is claimed is:

1. A method for making piston rubbers comprising the steps of:
    wrapping a length of rubberized thread fabric several times around a mandrel and over itself in volute fashion to define a plied sleeve having a desired radial thickness with side portions of the thread fabric at an outer generally cylindrical surface of the sleeve;
    radially cutting the sleeve into a plurality of bands having desired widths;
    positioning the bands and elastomeric material in mold cavities of generally cylindrical piston rubber shape so that portions of the thread fabric at the outer generally cylindrical portion of the sleeve are juxtaposed a mold surface portion having the cylindrical piston rubber shape;
    pressurizing, heating, curing and molding the bands and elastomeric material together to define piston rubbers while leaving side portions of the thread fabric at an exterior portion of the piston rubbers to define wear-resistant surfaces.

2. The method as claimed in claim 1 which further includes the step of:
    aligning threads of the threaded fabric at the outer generally cylindrical surface portion of the sleeve to be longitudinally oriented with the sleeve.

* * * * *